United States Patent [19]

Harter

[11] 4,103,425

[45] Aug. 1, 1978

[54] MARINE NAVIGATIONAL PROTRACTOR

[76] Inventor: B. Wayne Harter, 823 Canyon Rd., Redwood City, Calif. 94062

[21] Appl. No.: 638,825

[22] Filed: Dec. 8, 1975

Related U.S. Application Data

[63] Continuation-in-part of Ser. No. 501,821, Aug. 28, 1974.

[51] Int. Cl.² ............................................. G01C 21/00
[52] U.S. Cl. .................................. 33/1 SD; 33/1 N; 33/109
[58] Field of Search ............... 33/1 B, 1 N, 1 SD, 75, 33/76 VA, 80, 109

[56] References Cited

U.S. PATENT DOCUMENTS

| 127,949 | 6/1872 | Batchelder | 33/109 |
|---|---|---|---|
| 1,245,304 | 11/1917 | Zona | 33/1 N |
| 2,415,277 | 2/1947 | Caston | 33/80 |
| 2,717,448 | 9/1955 | Lubin et al. | 33/76 VA |
| 3,496,640 | 2/1970 | Warner | 33/1 SD |
| 3,611,574 | 10/1971 | Young et al. | 33/1 SD |

FOREIGN PATENT DOCUMENTS

| 529,509 | 6/1955 | Italy | 33/1 B |

Primary Examiner—Richard E. Aegerter
Assistant Examiner—John W. Shepperd

[57] ABSTRACT

A transparent plastic marine navigational protractor (chart overlay) which provides position from crossed bearings, new course to destination, course correction for drift, computation of estimated time of arrival, direct reading (conversion without reference to separate tables) of magnetic and steering compass equivalents of true geographic directions, continuous readout of dead reckoning and estimated positions, along with solutions to other relative motion problems, all without drawing any lines or resorting to the use of separate computer or scratch pad, and by using only one hand.

1 Claim, 2 Drawing Figures

MAGNETIC COURSES ENTERED WITH PENCIL

STEERING COMPASS READINGS ENTERED WITH PENCIL

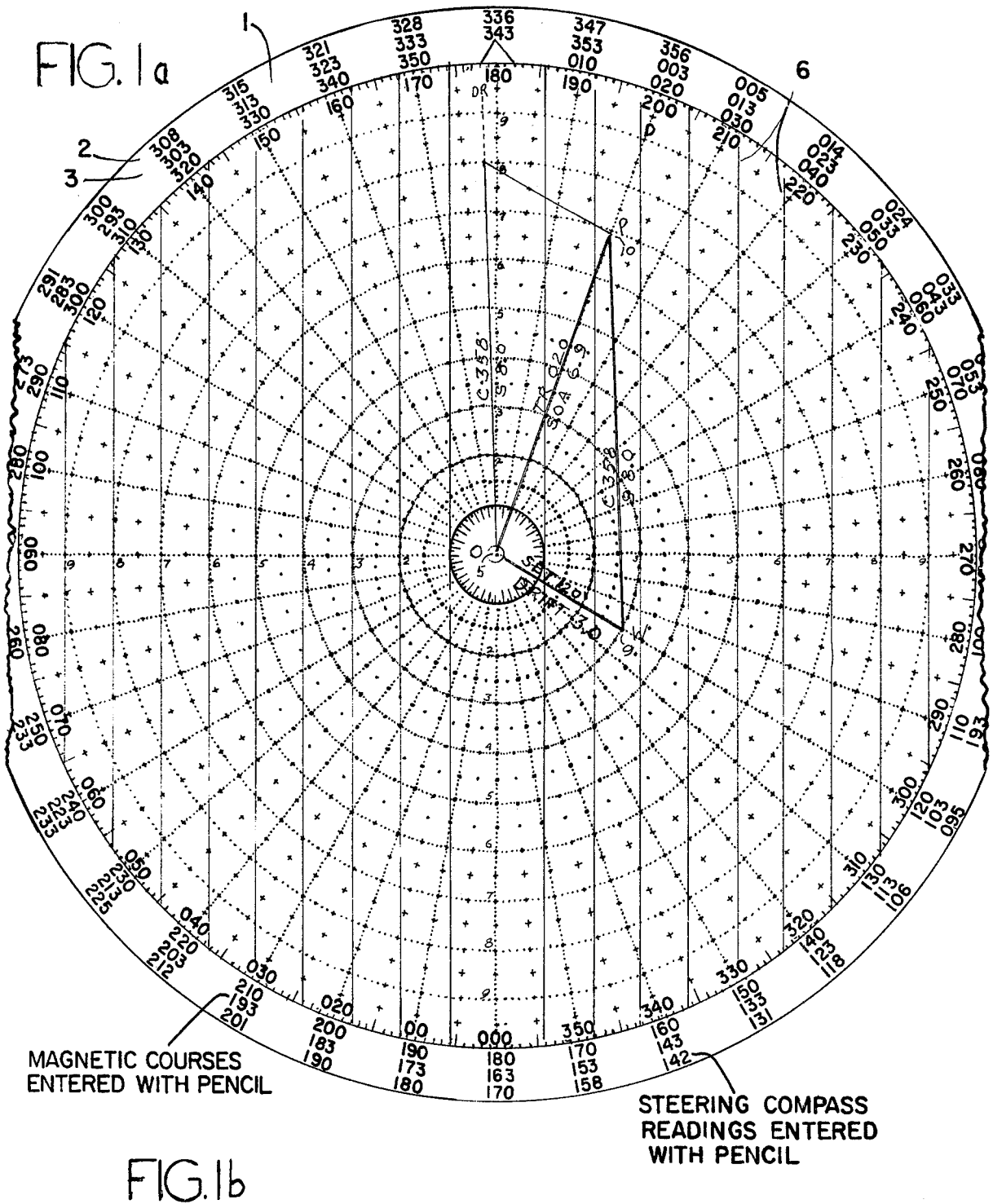

MARINE NAVIGATIONAL PROTRACTOR

This is a "continuation-in-part" of the now pending application described as follows:

Sole applicant: B. Wayne Harter
File No.: 501,821
Filing date: Aug. 28, 1974
Group art No.: 243.

The purpose of this continuation is to separate from the parent application that part, but that part only (without abandonment of the remainder), which deals with the navigational protractor described above in this application in those sections labelled "Title of invention" and "Abstract of the disclosure," and thereby to include improvements and capabilities described in communications carrying Patent Office dates of May 7, 1975 and Aug. 8, 1975, but not included in the parent application. All features and uses which comprise the subject matter of the present application were included in the parent application except the following "new matter":

1. A ⅜ inch border 1 added to the periphery of the circular protractor, with the surface thereof treated so as to accept the entry of erasable data 2 & 3 with graphite pencil, first described in communication bearing Patent Office date of Aug. 8, 1975, Amendment No. 1, par. 3).

2. Use of the subject instrument to obtain an automatic and continuous updating of dead reckoning or estimated position, first described in communication bearing Patent Office date of Aug. 8, 1975, Amendment No. 4, this point requiring new matter in the specification but not in the claim.

3. A separate but accompanying graduated cylindrical straight-edge 3 with the approximate dimensions of a common lead pencil and with non-skid rubber tires 4 on each end to provide parallel motion in moving the third side of the vector triangle to the center of the instrument, first described in communication bearing Patent Office date of May 7, 1975, Amendment No. 5, page 11, last two sentences.

This specification, and the claim which follows, include the foregoing new matter, along with a repetition of subject matter included in the parent application, though some language taken from the parent application may have been revised in the interests of conciseness.

FIGS. 1 and 1a show all significant features of the subject device.

Printed on clear plastic with a thickness of approximately 1/16 of an inch, this device has a diameter of about fourteen inches. The vector diagram shown in FIG. 1 is not in actual practice drawn on the face of the instrument, and is shown in FIG. 1 only to illustrate that which the operator would normally see only in his mind's eye. The recommended procedure is for the operator to visualize the vector triangle with the aid of the cylindrical straight-edge, FIG. 1a, since this permits rapid and accurate solutions with only one hand, though persons who prefer to do so can of course draw (using two hands) the actual diagram on the face of the instrument.

The various significant features of this instrument can best be described by incorporating such description into a detailed discussion of the uses and functions for which it was designed. A step-by-step discussion of the uses and capabilities of this device is in turn best preceded by a definition of terms:

C = Direction of dead reckoning course, or steering direction
S = Speed of vessel through the water
Set = Direction of movement of current
Drift (Dr) = Velocity of current
TR = Desired track ("true" direction from present location to intended destination)
SOA = Speed of advance, or speed expected to be made good over ground toward destination, and used to compute ETA
ETA = Estimated time of arrival
O = Origin or movement of both vessel and water
DR = Dead reckoning position—a result solely of movement of vessel through the water, or that place where the vessel would end up after a given amount of time if current were zero
W = Position of vessel solely as a result of movement of the water, or that place where the vessel would end up after a given amount of time if it had no way on at all
P = Position of vessel as a result of the simultaneous effect of movement of vessel through the water and the movement of the water itself
D = Intended destination The step-by-step procedure, then, would be as follows:

1. Before placing the instrument in service a. Enter on the periphery of the instrument 1 in that part of the border treated to accept the entry of erasable data with a graphite pencil a row of figures 3 which represent the magnetic equivalents of true directions permanently printed on the periphery of the instrument, at ten degree intervals, as in the case of data permanently printed thereon. Magnetic equivalents will, of course, be different from true directions in each case by the amount of local magnetic variation printed on the nautical chart for the area in which the vessel is operating, and this data must be changed when the vessel enters an area with a different local magnetic variation. This will be the middle row of figures on the border and will normally identify the lines to be read when the operator is using a hand-bearing compass held at least three feet from any deviation-causing ferrous material, since such a compass will point to "magnetic north" but will usually have little or no other instrument error or deviation.

b. Enter on the periphery of the instrument an outside row of figures 2, at ten degree intervals, which represent the steering compass equivalents of the "true" and "magnetic" values appearing in the inner and middle rows. This data is taken from the deviation table which was prepared when the steering compass was calibrated, and will change only on those rare occasions when local magnetic variation changes (as described in the preceding paragraph) or when the magnetic field around the steering compass is for some reason changed. This outside row of figures will identify the lines to be read when the operator is using the vessel's steering compass.

c. On each nautical chart enter a table of "Minutes to Traverse." This table will tell the operator how many minutes are required at various speeds to traverse a distance on the chart equal to one circle, two circles, or any number of circles up to the maximum number provided—probably twelve though only ten are illustrated in FIG. 1.

2. While underway a. When getting underway place the center of the instrument 5 on the chart over the point of departure, and align the multiple parallel lines 6 with the chart meridians.

b. Periodically consult the chronometer to determine elapsed time and then read from the table on the chart the number of circles traversed along the course line (track line if heading has been adjusted for current) to determine dead reckoning or estimated position. Whenever a significant change of speed or course occurs, or when most circles have been traversed on a given course line, advance the instrument on the chart so that the indicated position of the vessel is again in its center. This feature is particularly useful to sailboats making frequent tacks while beating to windward. Mental interpolation for distances which lie between circles, or for speeds which lie between even knots, is exceedingly easy.

c. Take periodic fixes to identify position with greater precision (1) Take bearings on two (or perhaps even three) charted navigational aids or landmarks, using hand-bearing compass (or hand-held radio direction finder with built-in compass) as this requires only one hand.

(2) Align parallel lines 6 on the protractor with meridians on the chart.

(3) Move instrument straight north or south on the chart until the first bearing line intersects the object sighted, thus establishing the first line of position; use middle row of figures on periphery of instrument (those indicating "magnetic" directions) when readings are from hand-bearing compass.

(4) Without disturbing the north-south orientation of the instrument, move it back and forth along the first line of position until the second bearing line intersects the second object sighted, thus establishing the second line of position.

(5) Re-check to be sure the multiple lines 6 still lie parallel to chart meridians and that both position lines intersect the objects sighted.

(6) The position of the vessel has now been fixed at that location identified by the center of the protractor; a small hole 5 permits marking the chart if desired.

NOTE that all the foregoing has been accomplished without drawing bearing lines and using only one hand and a few seconds of time.

d. Find destination on the chart and read from the periphery of the protractor the directional value of that line which connects the position just established with such intended destination; this is the desired track, or TR.

e. Correct the desired track just established for drift to obtain "true" steering course C.

Assumptions:
True course to destination (TR) is 020°
Vessel is moving through the water at 8 knots
Current is setting 120° at 3 knots (determined from published tide data or leeway since last fix)

(1) Move out from the center of the instrument 5, or point O (the origin of movement of both vessel and water), along the 120° line a distance of three circles (distance water moves in one hour) and spot in point W by eye.

(2) Find the distance the vessel moves through the water in one hour on the cylindrical straight-edge 3 (eight calibration marks 7 or circles in our example); then place the end of the straight-edge 8 on point W 9.

(3) Swing the straight-edge until the measured distance (8 circles) rests on the TR line to establish point P 10.

(4) Line WP now indicates the steering course C which compensates for drift, and which will carry the vessel in a straight line toward its intended destination. Roll straight-edge to center of instrument and read corrected course at periphery. For steering compass course, read from the outside row of figures since already adjusted for variation and deviation.

(5) The distance (measured in circles) from P back to O now indicates the speed SOA which the vessel can be expected to make over ground toward its destination, and this SOA is used to compute mentally the estimated time of arrival ETA, again by applying this speed to the number of circles from vessel to destination and with the aid of the "Minutes to Traverse" table which has been entered on each chart. In this example the vessel will make good a speed of 6.9 knots toward its destination by steering a true course of 358°.

NOTE again that all the foregoing has been accomplished without drawing any lines and by using only one hand. For vessels moving at a speed which exceeds the number of circles provided, each circle should be read as two knots of speed, and this applies to current movement as well as vessel movement.

One further point is in order. The steering compass values entered by pencil in the outer row of data 2 are, like those in the middle (magnetic) and inner (true) rows, entered at intervals representing ten degrees of arc; but, unlike the figures appearing in the middle and inner rows, adjoining entries in the outer row will not necessarily differ from each other by a uniform value of ten. This rather interesting condition results from the fact that compass "deviation" (error caused by the magnetic field in the immediate vicinity of the ship's compass) is never uniform as one proceeds around the compass card. It is therefore necessary in reading the compass (outer row) value 2 of a course or bearing line which falls between pencil entries to interpolate between those values which lie on each side of such line, just as one would interpolate if reading such value from a separate compass deviation or correction table. The important point here is that such interpolation can be performed mentally with great ease and speed, that mental interpolation is quite accurate and entirely satisfactory, and that mental interpolation is to be strongly recommended.

I claim:

1. A 360° marine navigational protractor comprised of a transparent plastic disc, or chart overlay; with sufficient diameter to cover a geographic area on a conventional coastwise or harbor chart which includes most landmarks and navigational aids from which useful bearings can be taken; with graduations marked by means of short lines on the periphery at one degree intervals, the numerical values of said graduations being permanently printed thereon at ten degree intervals, along with reciprocals (values of graduations 180° away, or on the opposite side) permanently printed in smaller figures, and with slightly longer and more vivid graduations identifying each intervening five-degree mark; with equally-spaced circles printed from the center to the periphery, separated by a distance equal to one-half nautical mile on a chart with a scale of 1:80,000, and comprised of small but highly-visible dots rather than solid lines, said dots printed at one degree intervals, with still more visible dots or other appropriate marks being used at each five degree interval, said circles to be numbered consecutively in four places 90° apart, with number "1" being nearest the center; with straight lines radiating from the center and printed on the face of the instrument, starting at the inner most circle and extending to the periphery, at ten degree intervals, said lines consisting of highly-visible dots rather than solid lines, each such dot representing one-tenth of the distance between circles, and with each fifth dot being more visible than the others; with a red-colored triangular pointer, or arrowhead, identifying the zero degree ("north" designation) printed on the periphery; with solid lines printed parallel to the 0° – 180° axis and tangent to the circles; with a border approximately ⅜ inch wide outside the periphery heretofore described, with the surface thereof treated so as to be translucent and permit the entry of erasable data with a common graphite pencil; with a small hole (no more than ⅛ inch diameter) in the exact center of the instrument; and with an accompanying but separate cylindrical straight-edge of the approximate dimensions of a common "lead" pencil, carrying graduations permanently marked thereon equal to the spacing of the circles heretofore described, having ends which have been dipped in liquid latex or otherwise equipped with non-skid rubber tires.

* * * * *